(12) United States Patent
Nahum et al.

(10) Patent No.: US 10,785,163 B2
(45) Date of Patent: Sep. 22, 2020

(54) MAINTAINING A QUEUING POLICY WITH MULTIPATH TRAFFIC

(71) Applicant: INTERNATIONAL BUSINESS MACHINES CORPORATION, Armonk, NY (US)

(72) Inventors: Erich Nahum, New York, NY (US); Thai Franck Le, White Plains, NY (US); Yeon-sup Lim, White Plains, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 10 days.

(21) Appl. No.: 16/287,634

(22) Filed: Feb. 27, 2019

(65) Prior Publication Data
US 2020/0274819 A1    Aug. 27, 2020

(51) Int. Cl.
*H04L 12/863* (2013.01)
*H04L 29/06* (2006.01)
*H04L 12/851* (2013.01)

(52) U.S. Cl.
CPC ........ *H04L 47/625* (2013.01); *H04L 47/2441* (2013.01); *H04L 69/16* (2013.01)

(58) Field of Classification Search
CPC .... H04L 47/625; H04L 47/2441; H04L 69/16
See application file for complete search history.

(56) References Cited

U.S. PATENT DOCUMENTS

| | | | |
|---|---|---|---|
| 8,452,901 B1 | 5/2013 | Sandstrom et al. | |
| 2005/0074005 A1* | 4/2005 | Okuno | H04L 49/3009 370/389 |
| 2006/0087989 A1 | 4/2006 | Gai et al. | |
| 2006/0234704 A1* | 10/2006 | Lee | H04L 27/2608 455/434 |
| 2013/0182573 A1* | 7/2013 | Soppera | H04L 69/163 370/235 |
| 2014/0052951 A1* | 2/2014 | Kulmala | G06F 3/0656 711/165 |
| 2017/0171098 A1* | 6/2017 | Le | H04L 47/6275 |
| 2017/0318130 A1* | 11/2017 | Ripke | H04L 45/24 |

* cited by examiner

*Primary Examiner* — Mohammad S Anwar
(74) *Attorney, Agent, or Firm* — Griffiths & Seaton PLLC

(57) ABSTRACT

Various embodiments are provided for managing queuing policies in a computing environment. Data packets may be classified into one of a plurality of queues based on information extracted from one or more multipath data flows. The data packets in the plurality of queues may be scheduled and sent according to one or more multipath data flows.

17 Claims, 12 Drawing Sheets

MAINTAINING A QUEUING POLICY WITH MULTIPATH TRAFFIC

BACKGROUND OF THE INVENTION

Field of the Invention

The present invention relates in general to computing systems, and more particularly to, various embodiments for managing and maintaining a queuing policy with multipath traffic in a computing environment by a processor.

Description of the Related Art

In today's society, consumers, business persons, educators, and others use various computing network systems with increasing frequency in a variety of settings. Computer systems may be found in the workplace, at home, or at school. Computer systems may include data storage systems, or disk storage systems, to process and store data. In recent years, both software and hardware technologies have experienced amazing advancement. With the new technology, more and more functions are added, and greater convenience is provided for use with these computing systems.

SUMMARY OF THE INVENTION

Various embodiments for managing and maintaining a queuing policy with multipath traffic using one or more processors in a computing environment are provided. In one embodiment, by way of example only, a method for managing queuing policies in a computing environment, again by a processor, is provided. Data packets may be classified into one of a plurality of queues based on information extracted from one or more multipath data flows. The data packets in the plurality of queues may be scheduled and sent according to one or more multipath data flows.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
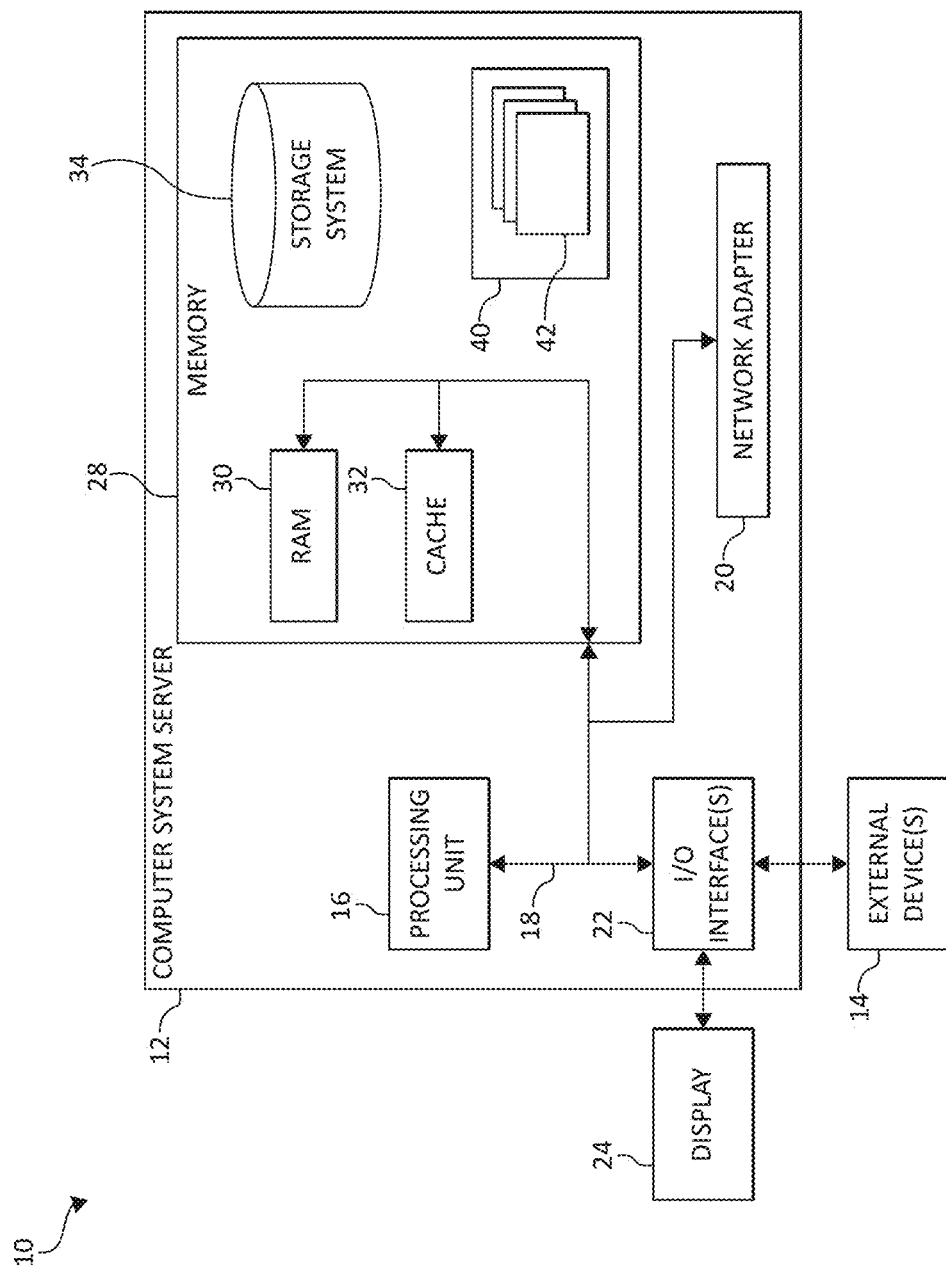
FIG. 1 is a block diagram depicting an exemplary computing node according to an embodiment of the present invention.

As a preliminary matter, a data network facilitates data transfers between two or more data processing systems. For example, an application executing in one data processing system acts as the sender of the data, and another application executing in another data processing system acts as the receiver of the data. Between the sender system and the receiver system, the data follows a data path that comprises a series of links between networking components, such as routers and switches. A link is also known as a hop. For example, a data network exists between a network interface in the sender system and a network interface in the receiver system. A Transmission Control Protocol (TCP) session between a sender system and a receiver system sets up a data communication path—a default path—using such a series of links through the data network.

TCP is a communication protocol used for communicating packet data from one data processing system to another over a data network. Establishing a TCP session between two data processing systems involves a multi-step exchange of preliminary information between the two systems. This multi-step exchange of information is called a three-way handshake, or simply, a handshake.

A multipath network is a data network in which more than one outgoing communication paths are available for sending data from a system, more than one incoming communication paths are available for receiving data at the system, or both. A data communication session, e.g., a TCP session with the system can use any one of the outgoing paths and any one of the incoming paths.

Multipath TCP (MPTCP) is a modification of TCP where multiple network interfaces can be concurrently used in a TCP session. For example, modern smartphones and other portable devices are able to communicate data over a variety of data networks, such as over cellular broadband and over Wi-Fi. Each network, over which a device communicates, may use a different network interface in the device. The communications over a cellular broadband network use a network interface in a device, which is designed and configured to communicate over a cellular broadband network, and similarly, the communications over Wi-Fi use a network interface in a device, which is designed and configured to communicate over a wireless TCP/IP network. As an example, MPTCP allows the device to use the cellular broadband network interface as well as the Wi-Fi network interface concurrently in a TCP session.

A portion of a TCP session data flow, which uses one of several network interfaces, is called a subflow. That is, a subflow may be a flow of TCP segments operating over an individual path, which forms part of a larger MPTCP connection. A subflow may be started and terminated similar to a regular TCP connection. An MPTCP connection may be set of one or more subflows, over which an application can communicate between two hosts and there may be a one-to-one mapping between a connection and an application socket.

In one aspect, a data network may include a forwarder for packet queuing and may buffer outgoing data packets for transmission on an egress link. Several problems may occur in this scenario. First, the outgoing link may be slower than the incoming one, leading to delay and drops. Second, bursty arrivals may overwhelm the forwarder, even though the long-term rate is acceptable. Third, the forwarder has a finite queuing capacity, i.e., buffering for maintaining packets over time before sending them. An additional problem occurs in the end-to-end scenario. Queues can grow and increase to very long queues leading to a term known as "Bufferbloat,", where the delay negatively affects the end-to-end response time. This in turn can lead to unnecessary delay, TCP retransmissions, and timeouts.

To overcome such challenges, in one aspect, a combination of classification and scheduling may be performed. Classification is when data packets are organized into flows, based some classification strategy (e.g., priority). The flows are transmitted based on scheduling policy such as, for example, transmitting the flows based on priority queues. Flows corresponding to a highest priority may be sent first, the second highest priority second, the third highest priority third, and so forth. It should be noted, however, that lower-level priorities may starve due to constant high-priority arrivals.

One of the challenges in MPTCP is that the adoption of MPTCP makes the endpoint invisible to the packet forwarder by using 2 or 4-tuples. The packet forwarder views these as two or more flows rather than one flow. This potentially advantages the MPTCP flow at the expense of original TCP traffic since the forwarder will prioritize packet queuing by allocating bandwidth based on flows, rather than on endpoints, which is the intent.

Accordingly, the present invention provides a solution for managing and maintaining a queuing policy with multipath traffic in a computing environment. Thus, the present invention utilizes the headers created by MPTCP rather than just the 4-tuples in isolation. The headers are encapsulated with the TCP headers option (e.g., the MP headers are encapsulated in the TCP headers). By looking at the headers, the present invention may augment the state kept by the forwarder to account for multipath flows.

Thus, in one aspect, the present invention provides for managing queuing policies in a computing environment. Data packets may be classified into one of a plurality of queues based on information extracted from one or more multipath data flows. The data packets in the plurality of queues may be scheduled and sent according to one or more multipath data flows.

In an additional aspect, the present invention provides for a queue management in a computing network environment. Multipath flow ("MP") information ("superflows") may be extracted from subflows. Data packets may be classified based on the MP flow. It should be noted that as used herein "superflow" (e.g., MP superflow) and "flow" (e.g., MP flow) may be synonyms and used interchangeably. The data packets may be placed into queues based on the MP flow. One or more scheduling operations may be performed based on the MP flow.

Multipath data information may be extracted from each header in the multipath data flows. Each of the multipath data flows may be a multipath transmission control protocol (MPTCP). Each of the multipath data flows and connection information may managed by a forwarder with a token (e.g., established by an MP_JOIN message), a pointer/key (e.g., a point to an identified primary flow), or a combination thereof. The multipath data flows may be identified according to a token, a pointer (e.g., a key), or a combination thereof contained in each header in the one or more multipath data flows. For example, a primary MPTCP flow, with an attached token to a header of the one or more multipath data flows, may observed for a first time. A secondary MPTCP flow may be created having both a pointer to a primary MPTCP flow and the attached token to a header of the one or more multipath data flows observed for a second time.

Thus, a forwarder is enabled to observe traffic in 1) one direction by identifying multipath flows based on a token (e.g., a primary flow is not identified but just subsequent subflows, and/or 2) both directions by identifying multipath flows based on both a key and token and is enabled to identify all flows such as, for example, primary flows and each subsequent subflows (e.g., in the scenario/case of both directions, there are two tokens, one for receiver and one for sender).

In an additional aspect, the MPTCP flow (e.g., primary flow) may be created with an MP_Capable bit, and a token in a reverse MPTCP flow may be created and stored. A second subsequent MPTCP flow may be created and both a token and a pointer to the primary MPTCP flow may be attached. A subsequent MPTCP flow may be assigned to the primary MPTCP flow if the token is attached to the subsequent MPTCP flow. Thus, in summary, during handshaking with MP_CAPABLE, a sender may send its key (MP_CAPABLE SYN with a sender's key). Then, a receiver's token is from the key. The handshaking with MP_JOIN uses this token (MP_JOIN SYN with a receiver's token) but a subsequent MPTCP flow uses a token to join an MPTCP connection but not with the key/pointer.

Thus, a forwarder can maintain a table for subflows with a map of (key, token) identifying, managing, pointing to, and/or associated with a MPTCP connection and 4 tuples identifying, managing, pointing to, and/or associated one MPTCP connection. It should be noted that the map can be generated only after observing MP_CAPABLE/MP_JOIN SYN. Subsequent MPTCP data packets do not have key/token information. A MP flow/connection identification may only be performed by observing establishment/join procedures.

Also, as used herein, a computing system may include large scale computing called "cloud computing" in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

It should be noted that one or more computations or calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
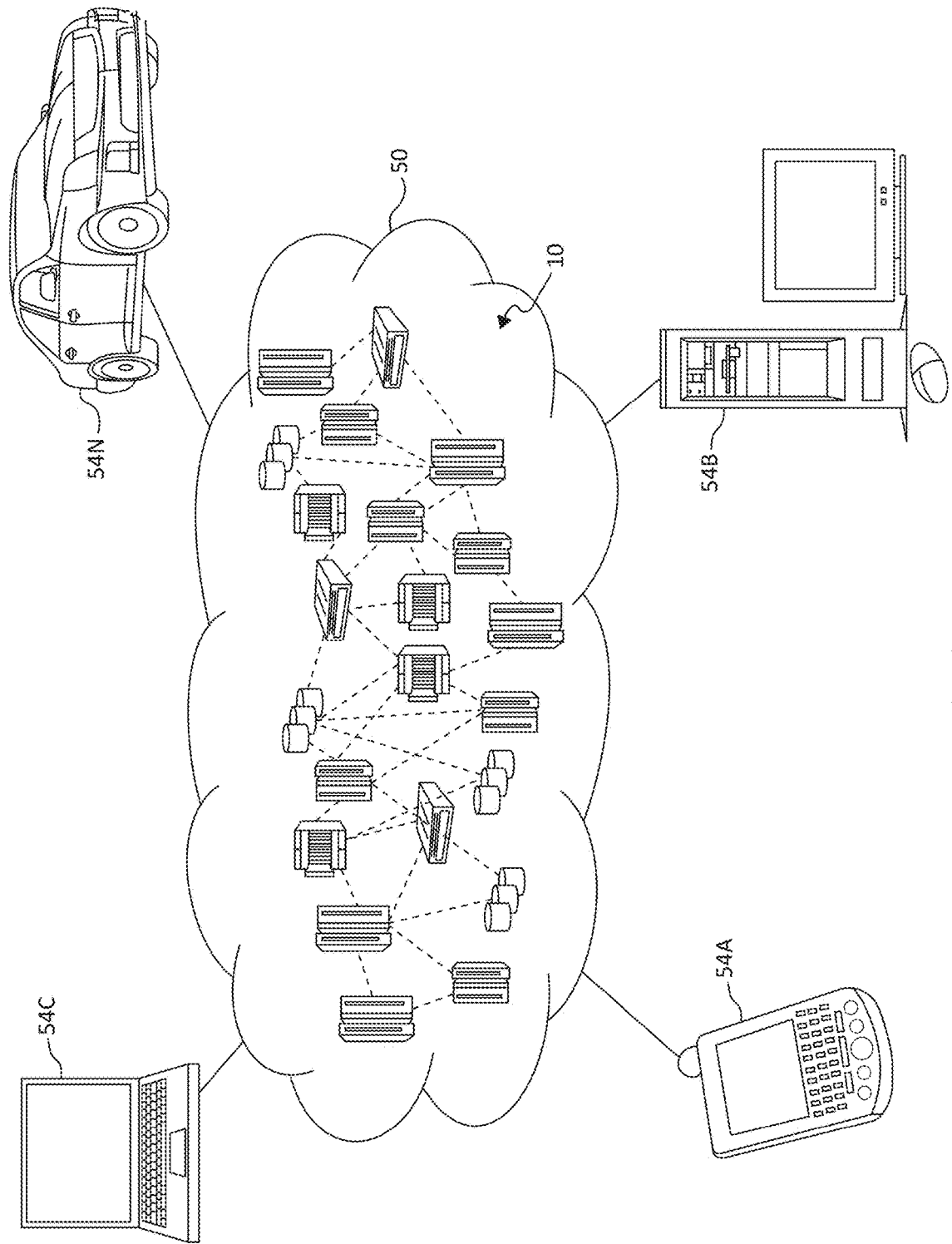
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
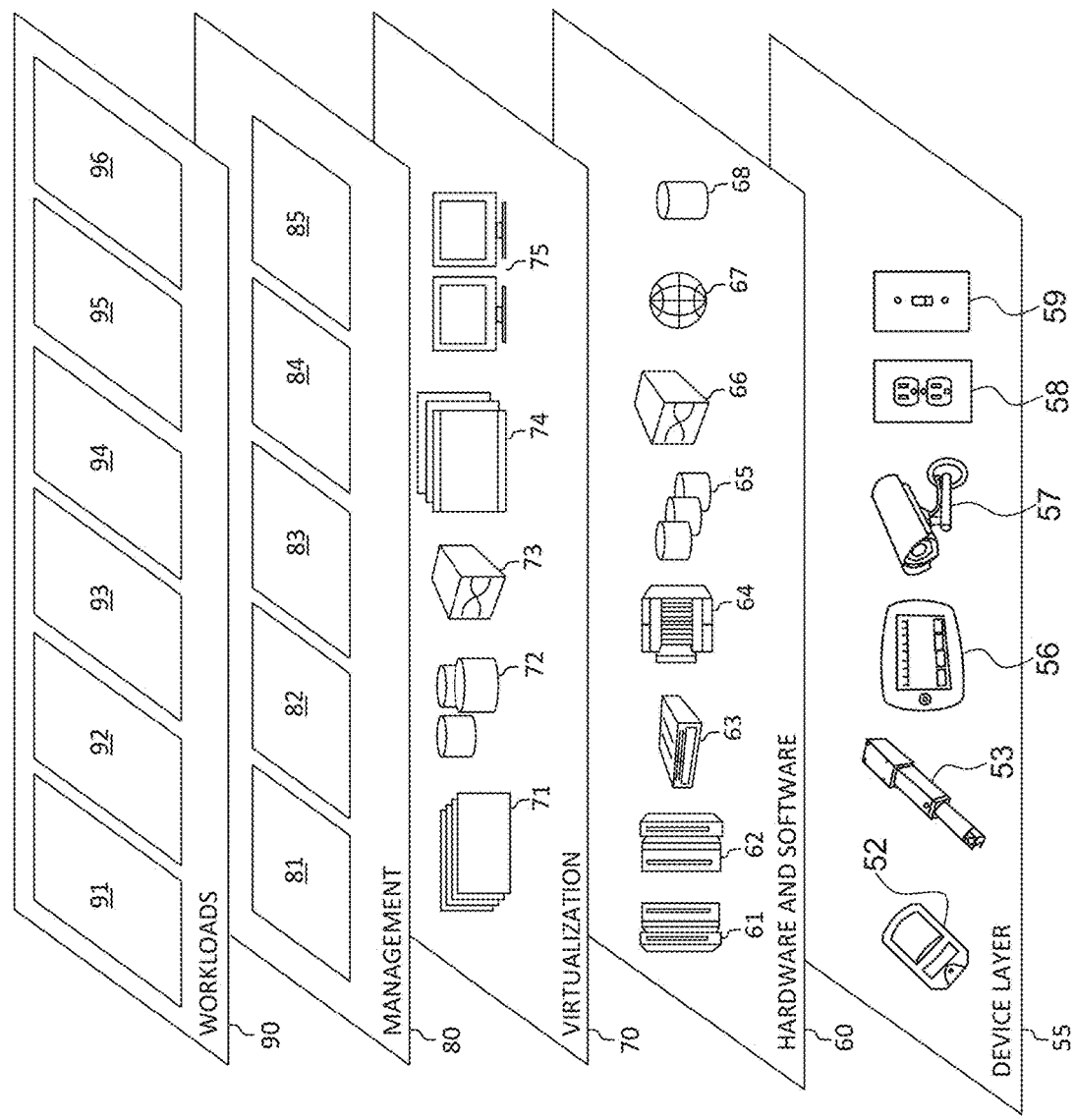
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing queuing policies. In addition, workloads and functions 96 for managing queuing policies may include such operations as data analytics, data analysis, and as will be further described, cryptographic switching functionality. One of ordinary skill in the art will appreciate that the workloads and functions 96 for managing queuing policies may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
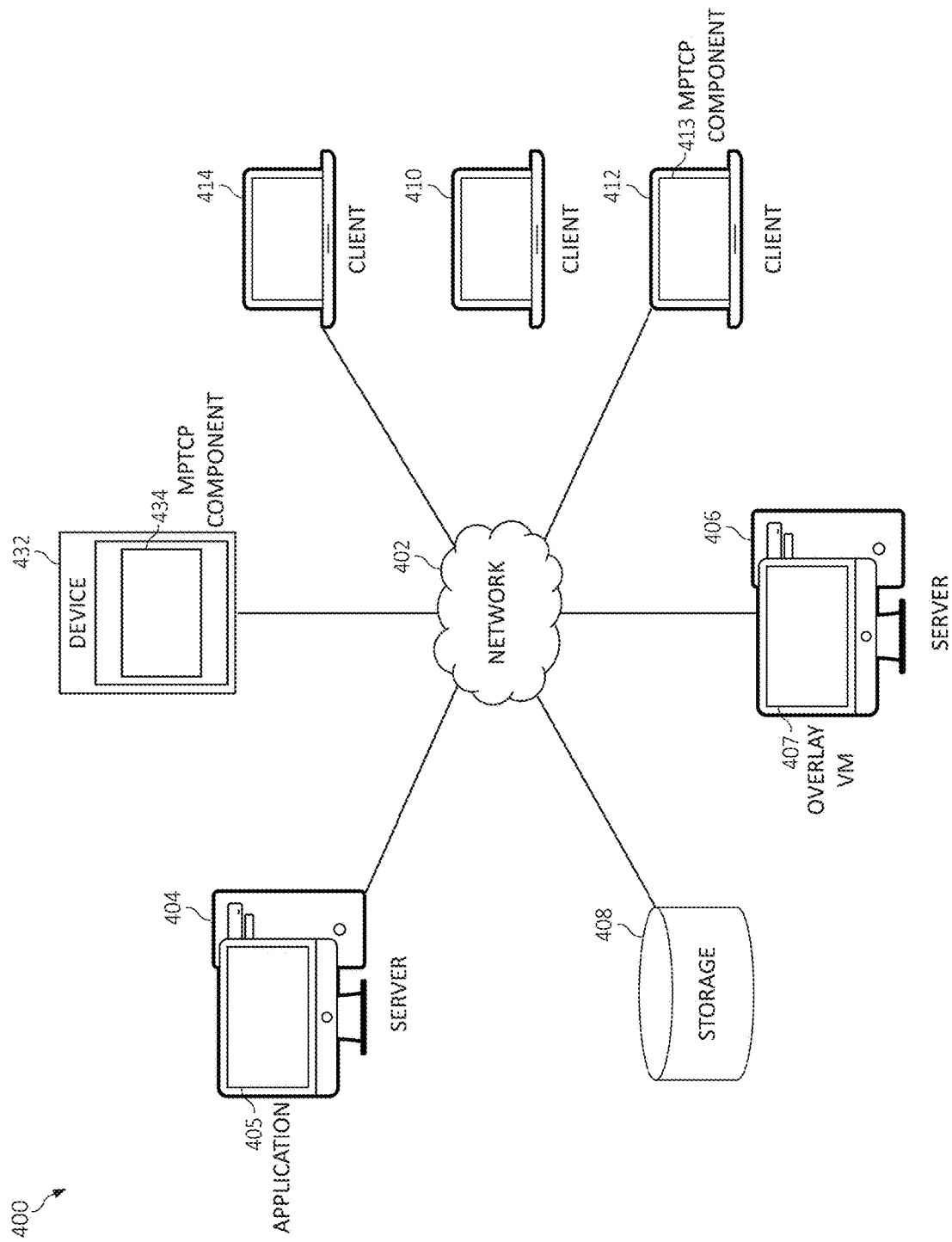
FIG. 4 is an additional block diagram depicting a network of data processing systems in in which aspects of the present invention may be realized.

Turning now to FIG. 4, a block diagram depicts a network of data processing systems in which illustrative embodiments may be implemented. Data processing environment 400 is a network of computers in which the illustrative embodiments may be implemented. Data processing environment 400 includes network 402. Network 402 is the medium used to provide communications links between various devices and computers connected together within data processing environment 400. Network 402 may include connections, such as wired communication links, wireless communication links, or fiber optic cables.

Clients or servers are only example roles of certain data processing systems connected to network 402 and are not intended to exclude other configurations or roles for these data processing systems. Server 404 and server 406 couple to network 402 along with storage unit 408. Software applications may execute on any computer in data processing environment 400. Clients 410, 412, and 414 are also coupled to network 402. A data processing system, such as server 404 or 406, or client 410, 412, or 414 may contain data and may have software applications or software tools executing thereon.

By way of example only, and without implying any limitation to such architecture, FIG. 4 depicts certain components that are usable in an example implementation of an embodiment. For example, servers 404 and 406, and clients 410, 412, 414, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems (e.g., servers and clients) 404, 406, 410, 412, and 414 also represent example nodes in a cluster, partitions, and other configurations suitable for implementing an embodiment.

Device 432 is an example of a device described herein. For example, device 432 can take the form of a smartphone, a tablet computer, a laptop computer, client 410 in a stationary or a portable form, a wearable computing device, or any other suitable device. Any software application described as executing in another data processing system in FIG. 4 can be configured to execute in device 432 in a similar manner. Any data or information stored or produced in another data processing system in FIG. 4 can be configured to be stored or produced in device 432 in a similar manner.

Server 404, client 412, and device 432 are each a non-limiting example of an endpoint as described herein. As an example, suppose that client 412 or device 432 establishes a TCP session with server 404. Application 405 in server 404 implements an embodiment described herein. Server 406 is an example of a data processing system in a datacenter. Server 406 is accessible to application 405 over network 402. Overlay VM 407 in server 406 is an example of an overlay VM that may be used. MPTCP capabilities are assumed at client 412 and device 432 only as a non-limiting example and are not necessary for the operation of an embodiment described herein. MPTCP component 413 provides MPTCP capabilities at client 412. MPTCP component 434 provides MPTCP capabilities at device 432.

Servers 404 and 406, storage unit 408, and clients 410, 412, and 414 may couple to network 402 using wired connections, wireless communication protocols, or other suitable data connectivity. Clients 410, 412, and 414 may be, for example, personal computers or network computers.

In the depicted example, server 404 may provide data, such as boot files, operating system images, and applications to clients 410, 412, and 414. Clients 410, 412, and 414 may be clients to server 404 in this example. Clients 410, 412, 414, or some combination thereof, may include their own data, boot files, operating system images, and applications. Data processing environment 400 may include additional servers, clients, and other devices that are not shown.

In the depicted example, data processing environment 400 may be the Internet. Network 402 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 400 also may be implemented as a number of different types of networks, such as for example, an intranet, a local area network (LAN), or a wide area network (WAN). FIG. 4 is intended as an example, and not as an architectural limitation for the different illustrative embodiments.

Among other uses, data processing environment 400 may be used for implementing a client-server environment in which the illustrative embodiments may be implemented. A client-server environment enables software applications and data to be distributed across a network such that an application functions by using the interactivity between a client data processing system and a server data processing system. Data processing environment 400 may also employ a service-oriented architecture where interoperable software components distributed across a network may be packaged together as coherent business applications.

Figure 5:
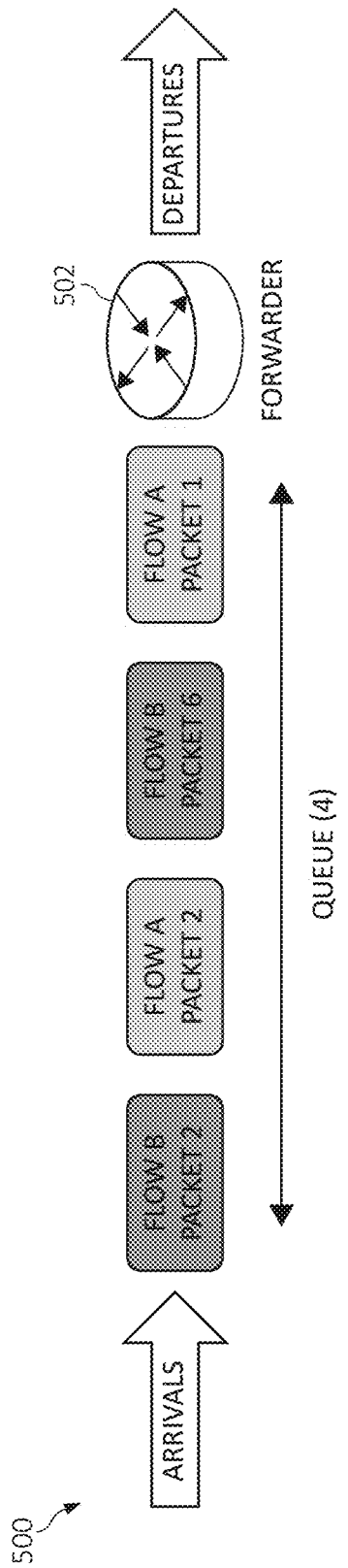
FIG. 5 is an additional block diagram depicting a queue at a forwarder in which aspects of the present invention may be realized.

Turning now to FIG. 5, a forwarder 502 in a computing network environment 500 (which may be implemented in FIGS. 1-4) is depicted which has a queue of packets (e.g., flow B/packet 2, flow A/packet 2, flow B/packet 6, flow A/packet 1) arriving thereto. That is, the forwarder 502 can simultaneously receive packets and buffer/send outgoing packets. However, one or more challenges are experienced by the forwarder 502 such as, for example, the outgoing link (e.g., departures from the forwarder) may be slower than the bursty arrivals of the flows/packets and thus overwhelm the forwarder 502 since the forwarder 502 only has a finite queuing capacity of the data packets. Thus, the queues of the forwarder 502 may increase and grow creating what is called "bufferbloat." The queueing delay increases thereby affecting response time, adds unnecessary delay, causes unnecessary TCP time outs/retransmissions, exhausts memory and new data packets may be dropped, and may not preserve fairness (e.g., flow A is not treated equally with flow B).

It should be noted that the forwarder 500 is used in exemplary illustrations of the invention as a specific type of middlebox. However, the invention is not limited thereto. That is, forwarder 502 refers to networking devices such as bridges, routers, and certain types of network function appliances which are frequently termed middleboxes in the networking art.

Figure 6:
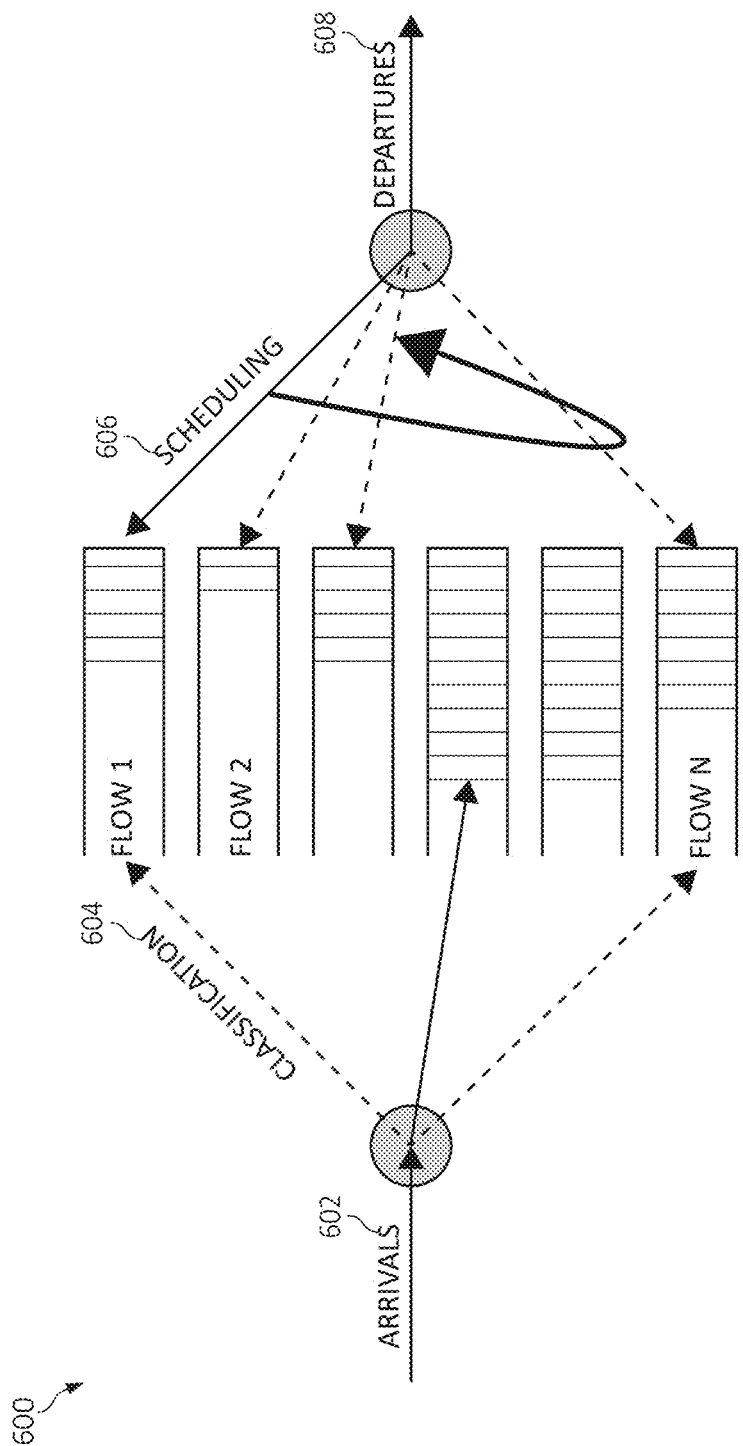
FIG. 6 is an additional block diagram depicting classification and scheduling of a queue at a forwarder in which aspects of the present invention may be realized.

Turning now to FIG. 6, block diagram 600 depicts classification and scheduling of a queue at a forwarder. In step 602, one or more data packets may arrive (e.g., "arrivals") such as, for example, arrive at a forwarder. In step 604, the data packets from one or more flows may be classified ("classification") into one of a plurality of queues (e.g., flow 1, flow 3, and flow N) based on extracted information from one or more flows. In step 606, the data packets in the plurality of queues may be scheduled ("scheduling") according to scheduling policy. In step 608, the data packets in the plurality of queues may be sent (e.g., "departures") according to scheduling policy. Thus, data packets may be classified into flows. The data packets in the flows may be sent according to a scheduling policy.

Figure 7:
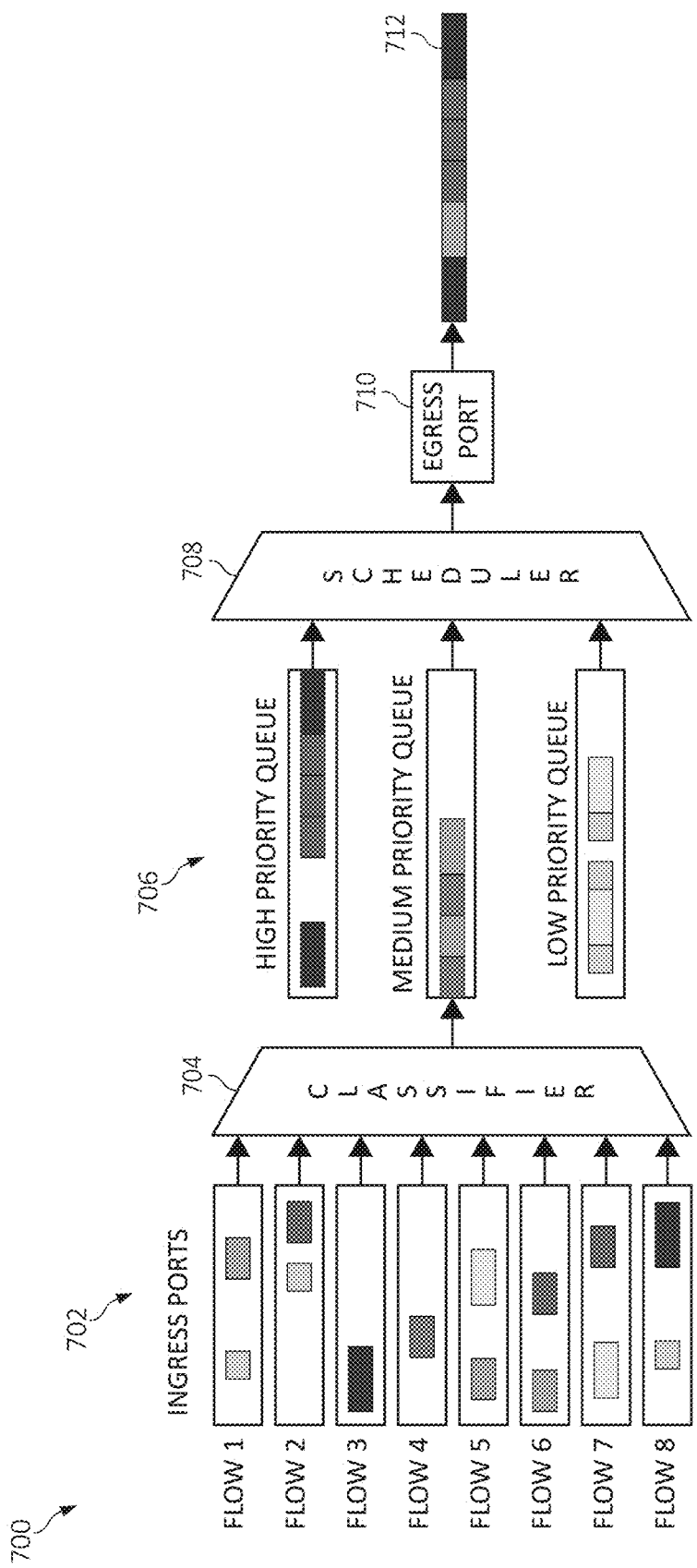
FIG. 7 is an additional block diagram depicting priority queuing at a forwarder in which aspects of the present invention may be realized.

Turning now to FIG. 7, block diagram 700 depicts priority queuing at a forwarder such as, for example, forwarder 502 in FIG. 5. Also, one or more components, functionalities, and/or features of FIGS. 1-6 may be implemented in FIG. 7. Each flow (e.g., flows 1-8) may be received from one or more ingress port. A classifier 704 may classify each data packet of each flow into one or more separate queues 706 (e.g., classify data packets based on source/destination internet protocol "IP" address, source/destination TCP port, etc.). All packets in a higher priority queue are served before a lower priority queue is served. For example, a high priority queue is served before a medium priority queue is served, and the medium priority queue is served before a low priority queue. If a higher priority packet arrives while a lower priority packet is being transmitted, a wait operation may be performed until the lower priority packet completes.

The classification may be based on the items/metadata in the packet header such as, for example, the 4 tuple (e.g., source/local address, source/local port, remote/destination address, remote/destination port), or 5-tuple (4 tuple plus the protocol/service field such as, for example, port 80 or Hypertext Transfer Protocol "HTTP"). The scheduling determines the transmission order that may follow a scheduling policy such as, for example, round-robin, fair queuing, weighted fair queueing, token bucket, stochastic fair queuing, core stateless fair queuing, etc. A related policy is a drop policy that addresses what to do when it is out of buffers.

Figure 8:
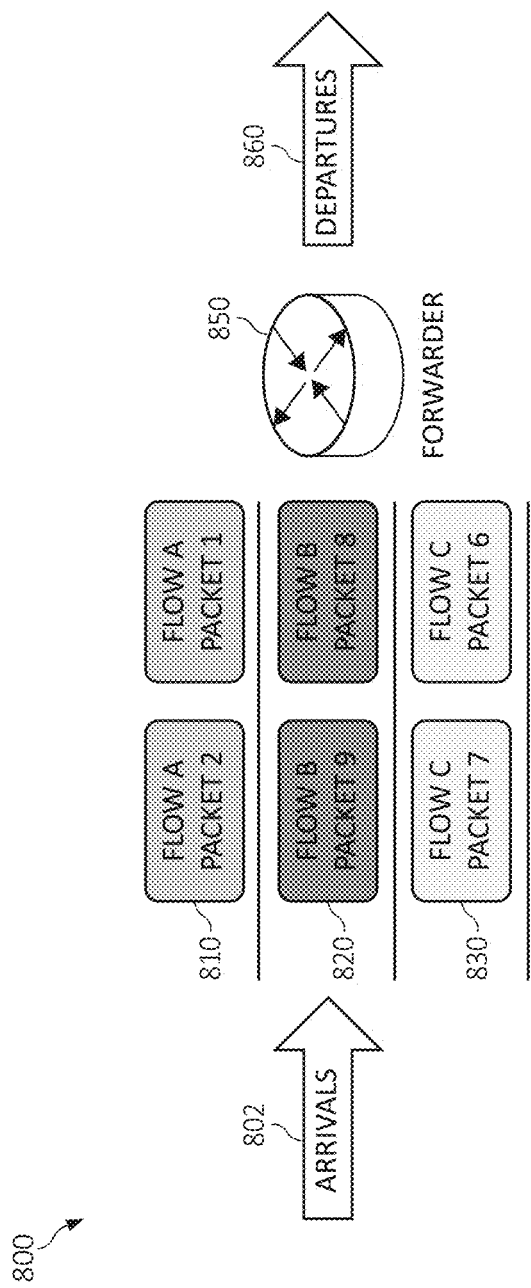
FIG. 8 is an additional block diagram depicting multipath flows at a forwarder in which aspects of the present invention may be realized.

However, the present invention addresses additional classification challenges such as, for example, the challenge in MPTCP when some of the flows originate from the same local/source address, as illustrated in FIG. 8. FIG. 8 is block diagram 800 depicting multipath flows at a forwarder 850 (see also forwarder 502 of FIG. 5). As illustrated, flow 810 includes flow A/packet 2 and flow A/packet 1, flow 820 includes flow B/packet 9 and flow B/packet 8, and flow 830 includes flow C/packet 7 and flow C/packet 6. However, if flow 810 and 820 (e.g., flow A and flow B) are from the same host than flow 830 (e.g., flow C) is only provided ⅓ of the bandwidth. It should be noted that flow 810 and flow 820 are from the same flow and flow 830 is from a different flow.

Thus, the present invention provides for classifying the flows such as, for example, flows 810, 820, and 830 according to MPTCP headers by analyzing the headers and extracting the information of a MP_JOIN and MP_CAPABLE and creating a corresponding state in the flow state. That is, data packets in flows 810, 820, and 830 may be classified into one of a plurality of queues based on information extracted from one or more MPTCP flows by extracting multipath data information from each header.

Figure 9:
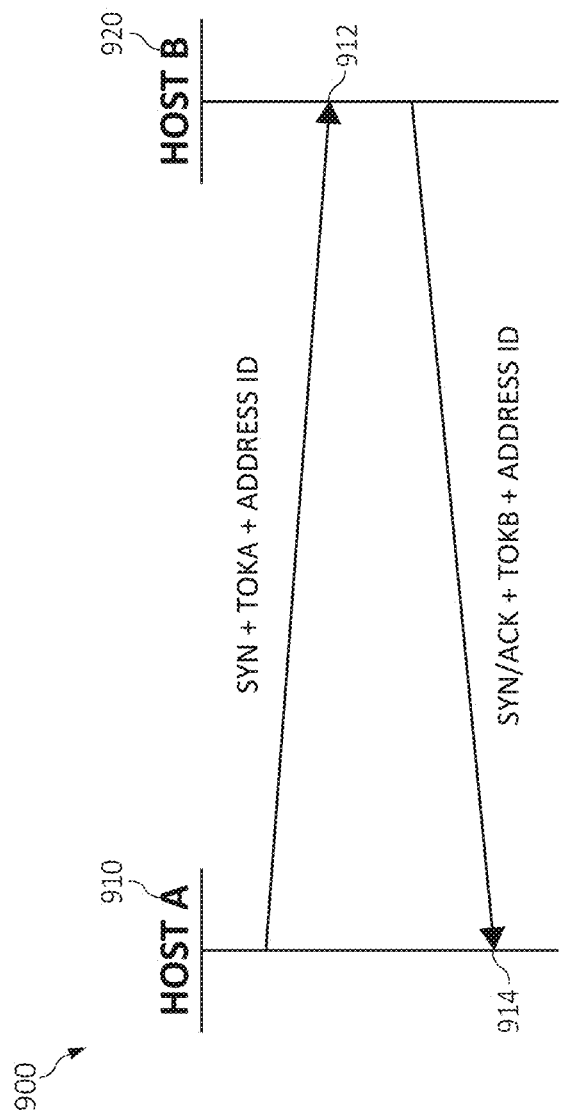
FIG. 9 is an additional block diagram depicting creation of a new subflow between a sending host and a receiving host in which aspects of the present invention may be realized.
Figure 10:
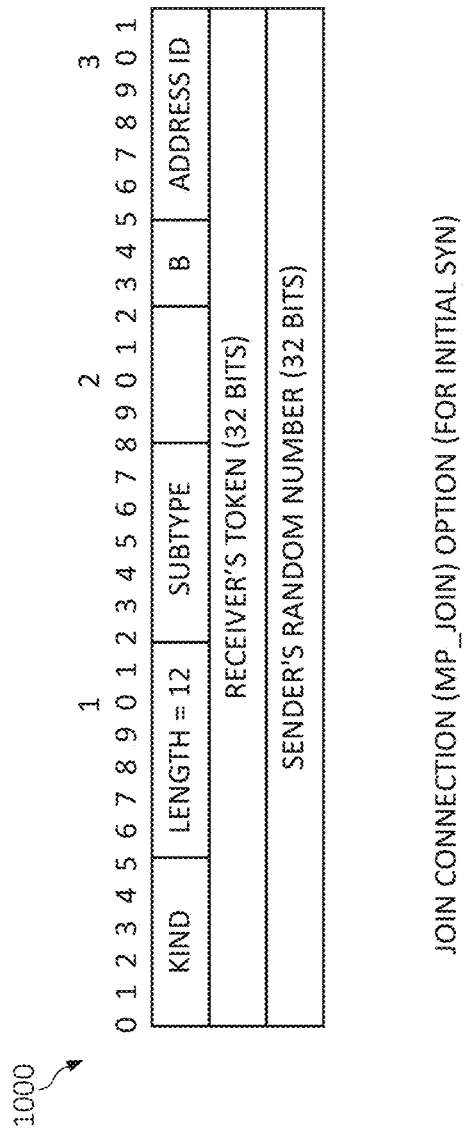
FIG. 10 is an additional block diagram depicting a join connection ("MP_JOIN") option for a synchronization ("SYN") header in which aspects of the present invention may be realized.

To further illustrate, consider the following operations of FIGS. 9 and 10. FIG. 9 is diagram 900 depicting creation of a new subflow between a sending host A 910 and a receiving host B 920. That is, FIG. 9 illustrates creating a subflow. The way each end host (e.g., host A 910 and/or host B 920) identifies an MP flow is with a pair of tokens. Thus, there are two tokens, one for each side and each side advertises its own token. Thus, host A 910 advertises "tokA" and host B 920 advertises "tokB." The option is an MP (multipath) option. Also, either one or both of the endpoints is new.

Said differently, both the address of the sending host A 910 and the receiving host B 920 are may be newly created (e.g., both local and remote IP addresses will be a new subflow). The TCP option contains the receiver's token (e.g., receiving host B 920) to identify the connection and the sender's identifier (e.g., sending host A 910) for the source address. That is, sending host A 910 sends a SYN packet 912 with a token (e.g., token A or "TokA") and address identifier ("ID"). Receiving host B 920 sends a SYN/ACK packet 914 with a token (e.g., token B or "TokB") and an address ID.

Turning now to FIG. 10, a join connection ("MP_JOIN") option is illustrated for a synchronization ("SYN") header 1000. That is, FIG. 10 is a MP_Join option for an initial SYN. The MP_Join option is added to the SYN packet containing the receiver's identifying token for the connection the sender wishes to join. The MP_Join option includes the sender's identifier for the source address.

In one aspect, for observing MPTCP traffic in one direction (e.g., observing from the perspective a forwarder), multipath flows may be identified based on the token (e.g., cannot identify primary MPTCP flow (e.g., primary MPTCP superflow) but only subsequent subflows. For observing MPTCP traffic in both directions, multipath flows may be identified based on both key (e.g., pointer) and token so as to identify all flows, including primary flow.

In one aspect, all flow data structures may be annotated with 2 extra fields: 1) a token (established by MP_JOIN message), and 2) a pointer to "primary" flow (e.g., a first subflow). For example, when an MP_JOIN header is observed, the receiving token (e.g. "rcv token") is analyzed. If this is the first time seeing/observing the MP_JOIN header (e.g., the first subflow), a new flow is created based on 4-tuple and a token is attached and the flow is indicated as a primary flow (e.g., "superflow") in relation to the MPTCP flows.

If the MP_JOIN header has been seen for a second or additional time, an nth subflow may be created for the primary flow (e.g., created for the same superflow. The nth flow is created based on 4-tuple and both a token and a pointer to the primary flow are attached. For subsequent data packets (e.g., hash on 4-tuple), each subsequent data packet is assigned to the primary flow if the subsequent flow has the token attached or may be assigned to a standard flow (e.g., a standard TCP flow without any MP options included). The subsequent data packets are data packets that have been seen before (e.g., not new) and a first data packet is a data packet that has not been seen previously (e.g., a new data packet).

In an additional aspect, all flow data structures may be annotated with 2 extra fields: 1) a MP_CAPABLE bit (established by MP_CAPABLE option), and 2) a token (established by MP_JOIN option), and 3) a pointer to a primary flow. Accordingly, the following operations may be performed. In step 1, for a first SYN packet with MP_CAPABLE, a new flow (e.g., a primary or superflow) may be created with MP_CAPABLE bit set. The new flow may be referred to as the primary or the superflow. In step 2, analyze the SYN-ACK to determine if the SYN-ACK includes a MP_CAPABLE_ACK. A lookup reverse flow may be performed. If the MP_CAPABLE_ACK exists in the SYN-ACK, a token may be calculated and stored in a reverse flow. In step 3, for a new SYN with MP_JOIN with token, a new flow may be created and both a token and a pointer to primary may be attached. In step 4, for each subsequent packet (e.g. hash on 4-tuple), if a flow includes an attached token, the subsequent packet is assigned to the primary flow, otherwise, the subsequent packet may be assigned to a standard flow.

Figure 11:
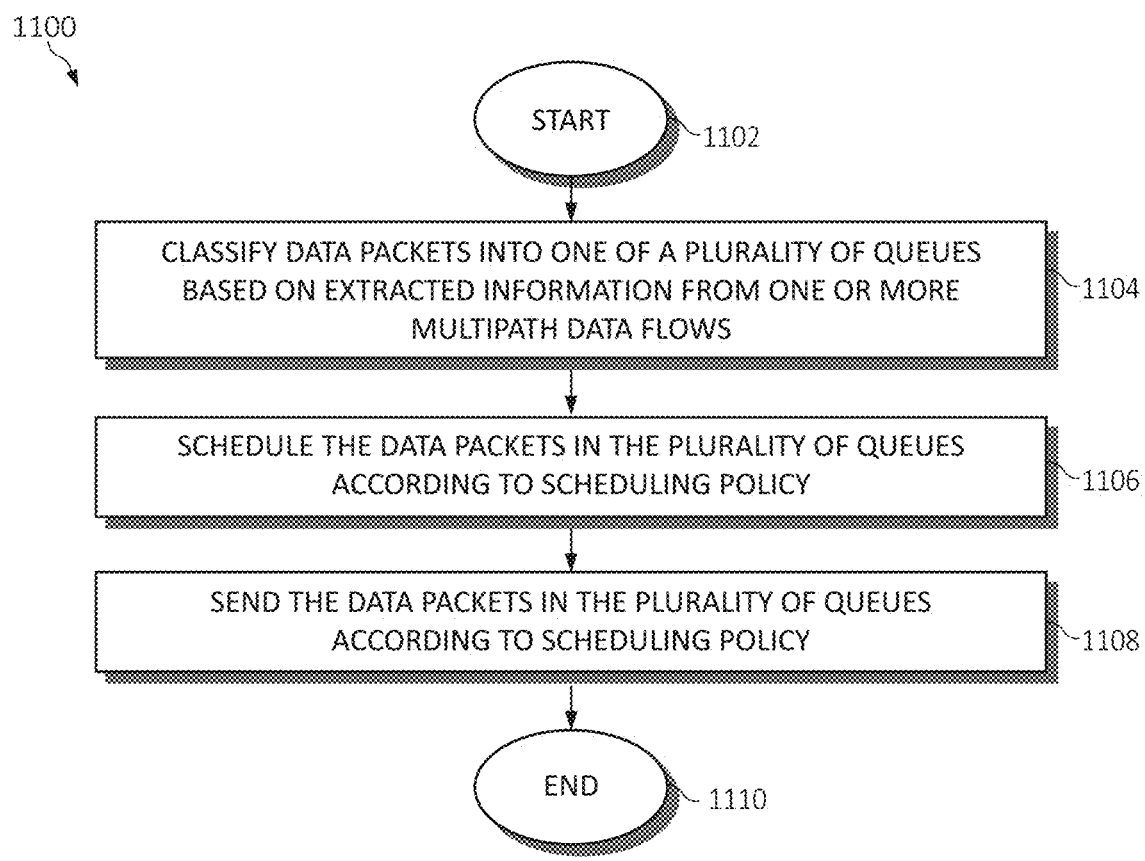
FIG. 11 is a flowchart diagram depicting an exemplary method for managing queuing policies in a computing environment by a processor, again in which aspects of the present invention may be realized.

Turning now to FIG. 11, a method 1100 for managing queuing policies in a computing environment by a processor is depicted, in which various aspects of the illustrated embodiments may be implemented. The functionality 1100 may be implemented as a method executed as instructions on a machine, where the instructions are included on at least one computer readable medium or one non-transitory machine-readable storage medium. The functionality 1100 may start in block 1102.

Data packets may be classified into one of a plurality of queues based on extracted information from one or more multipath data flows (e.g., classify according to header information annotated with a token, a pointer, or a combination thereof), as in block 1104. The data packets in the plurality of queues are scheduled according to scheduling policy, as in block 1106. The data packets in the plurality of queues according to scheduling policy, as in block 1108. The functionality 1100 may end, as in block 1110.

Figure 12:
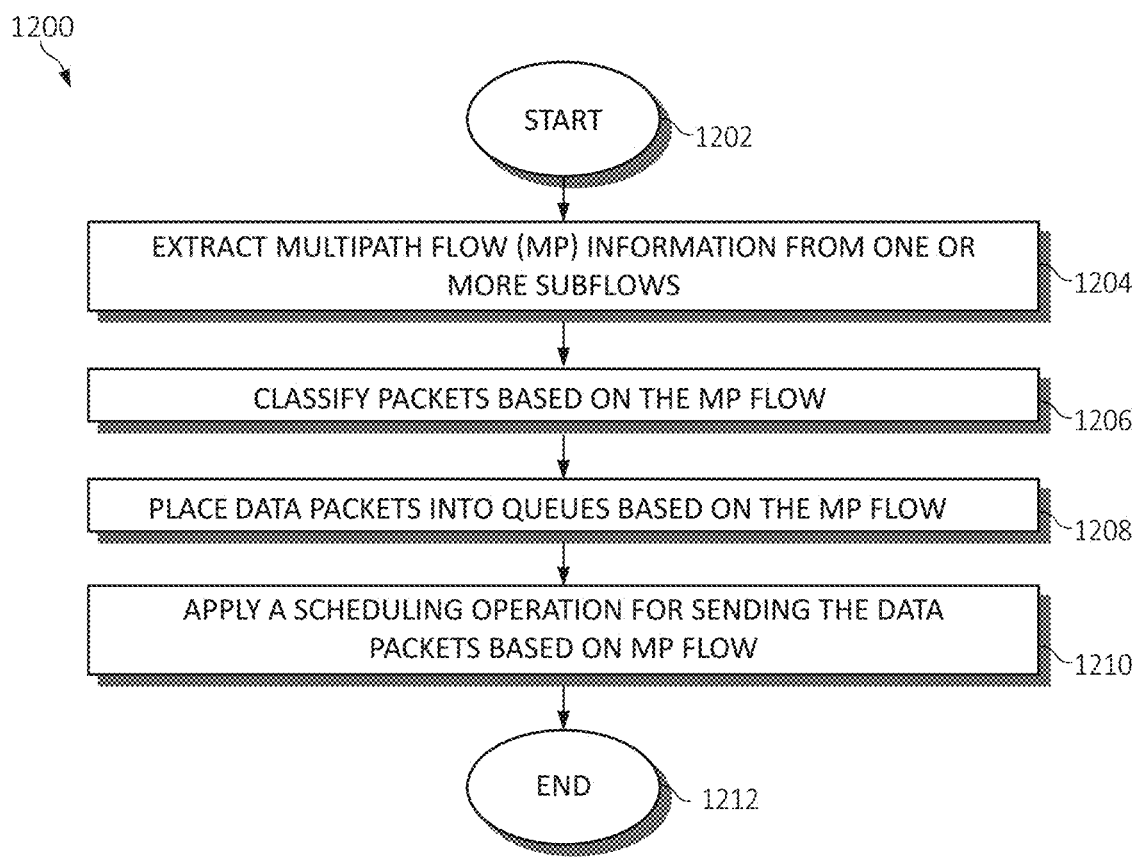
FIG. 12 is a flowchart diagram depicting an exemplary method for managing queuing policies in a computing environment by a processor, again in which aspects of the present invention may be realized.

Turning now to FIG. 12, a method 1200 for managing queuing policies in a computing environment by a processor is depicted, in which various aspects of the illustrated embodiments may be implemented. The functionality 1200 may be implemented as a method executed as instructions on a machine, where the instructions are included on at least one computer readable medium or one non-transitory machine-readable storage medium. The functionality 1200 may start in block 1202.

Multipath flow (MP) information may be extracted from one or more subflows, as in block 1204. Data packets may be classified based on the MP flow information, as in block 1206. The data packets may be placed into queues based on the MP flow information, as in block 1208. A scheduling operation may be applied for sending the data packets based on MP flow, as in block 1210. The functionality 1200 may end, as in block 1212.

In one aspect, in conjunction with and/or as part of at least one block of FIGS. 11-12, the operations of methods 1100 and 1200 may include each of the following. The operations of methods 1100 and 1200 may extract multipath data information from each header in the one or more multipath data flows. Each of the multipath data flows may be a multipath transmission control protocol (MPTCP). Each of the one or more multipath data flows may be annotated with a token, a pointer, or a combination thereof. The one or more multipath data flows may be identified according to a token, a pointer, or a combination thereof contained in each header in the one or more multipath data flows. A primary multipath transmission control protocol (MPTCP) flow with an attached token to a header of the one or more multipath data flows observed for a first time. A secondary MPTCP flow may be created having both a pointer to a primary MPTCP flow and the attached token to a header of the one or more multipath data flows observed for a second time.

The operations of methods 1100 and 1200 may create multipath transmission control protocol (MPTCP) flow with an MP_Capable bit, calculate and store a token in a reverse MPTCP flow, create a second MPTCP flow and attaching the token and a pointer to the primary MPTCP flow, and/or assign a subsequent MPTCP flow to the primary MPTCP flow if the token is attached to the subsequent MPTCP flow.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing queuing policies in a computing environment by a processor, comprising:
   classifying data packets into one of a plurality of queues based on information extracted from one or more multipath data flows; and
   scheduling and sending the data packets in the plurality of queues according to one or more multipath data flows; wherein the classifying and the scheduling further includes:
      creating a primary multipath transmission control protocol (MPTCP) flow with an MP_Capable bit;
      calculating and storing a token in a reverse MPTCP flow;
      creating a secondary MPTCP flow and attaching the token and a pointer to the primary MPTCP flow; or assigning a subsequent MPTCP flow to the primary MPTCP flow if the token is attached to the subsequent MPTCP flow.

2. The method of claim 1, further including extracting multipath data information from each header in the one or more multipath data flows, wherein each of the multipath data flows are of the MPTCP.

3. The method of claim 1, further including annotating each of the one or more multipath data flows with the token, the pointer, or a combination thereof.

4. The method of claim 1, further including identifying the one or more multipath data flows according to the token, the pointer, or a combination thereof contained in each header in the one or more multipath data flows.

5. The method of claim 1, further including creating the primary MPTCP flow with the token attached to a header of the one or more multipath data flows observed for a first time.

6. The method of claim 1, further including creating the secondary MPTCP flow having both the pointer to the primary MPTCP flow and the token attached to a header of the one or more multipath data flows observed for a second time.

7. A system for managing queuing policies in a computing environment, comprising:
one or more computers with executable instructions that when executed cause the system to:
classify data packets into one of a plurality of queues based on information extracted from one or more multipath data flows;
schedule and send the data packets in the plurality of queues according to one or more multipath data flows; wherein the classifying and the scheduling further includes:
creating a primary multipath transmission control protocol (MPTCP) flow with an MP_Capable bit;
calculating and storing a token in a reverse MPTCP flow;
creating a secondary MPTCP flow and attaching the token and a pointer to the primary MPTCP flow; or
assigning a subsequent MPTCP flow to the primary MPTCP flow if the token is attached to the subsequent MPTCP flow.

8. The system of claim 7, wherein the executable instructions extract multipath data information from each header in the one or more multipath data flows, wherein each of the multipath data flows are of the MPTCP.

9. The system of claim 7, wherein the executable instructions annotate each of the one or more multipath data flows with the token, the pointer, or a combination thereof.

10. The system of claim 7, wherein the executable instructions identify the one or more multipath data flows according to the token, the pointer, or a combination thereof contained in each header in the one or more multipath data flows.

11. The system of claim 7, wherein the executable instructions create the primary MPTCP flow with the token attached to a header of the one or more multipath data flows observed for a first time.

12. The system of claim 7, wherein the executable instructions create a secondary MPTCP flow having both a pointer to a primary MPTCP flow and a token attached to a header of the one or more multipath data flows observed for a second time.

13. A computer program product for managing queuing policies by a processor in a computing environment, the computer program product comprising a non-transitory computer-readable storage medium having computer-readable program code portions stored therein, the computer-readable program code portions comprising:
an executable portion that classifies data packets into one of a plurality of queues based on information extracted from one or more multipath data flows;
an executable portion that schedules and sends the data packets in the plurality of queues according to one or more multipath data flows; wherein the classifying and the scheduling further includes:
creating a primary multipath transmission control protocol (MPTCP) flow with an MP_Capable bit;
calculating and storing a token in a reverse MPTCP flow;
creating a secondary MPTCP flow and attaching the token and a pointer to the primary MPTCP flow; or
assigning a subsequent MPTCP flow to the primary MPTCP flow if the token is attached to the subsequent MPTCP flow.

14. The computer program product of claim 13, further including an executable portion that extracts multipath data information from each header in the one or more multipath data flows, wherein each of the multipath data flows are of the MPTCP.

15. The computer program product of claim 13, further including an executable portion that annotates each of the one or more multipath data flows with the token, the pointer, or a combination thereof.

16. The computer program product of claim 13, further including an executable portion that identifies the one or more multipath data flows according to the token, the pointer, or a combination thereof contained in each header in the one or more multipath data flows.

17. The computer program product of claim 13, further including an executable portion that:
creates the primary MPTCP flow with the token attached to a header of the one or more multipath data flows observed for a first time; or
creates the secondary MPTCP flow having both the pointer to the primary MPTCP flow and the token attached to a header of the one or more multipath data flows observed for a second time.

* * * * *